(12) United States Patent
Stoodley et al.

(10) Patent No.: US 7,840,950 B2
(45) Date of Patent: Nov. 23, 2010

(54) PROGRAMMATIC COMPILER OPTIMIZATION OF GLACIAL CONSTANTS

(75) Inventors: Kevin A. Stoodley, Richmond Hill (CA); Mark G. Stoodley, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 1117 days.

(21) Appl. No.: 11/371,724

(22) Filed: Mar. 9, 2006

(65) Prior Publication Data

US 2007/0240135 A1 Oct. 11, 2007

(51) Int. Cl.
G06F 9/45 (2006.01)
(52) U.S. Cl. ...................................... 717/151
(58) Field of Classification Search ........................ None
See application file for complete search history.

(56) References Cited

U.S. PATENT DOCUMENTS

| | | | |
|---|---|---|---|
| 5,274,823 A | 12/1993 | Brenner et al. | |
| 5,408,629 A | 4/1995 | Tsuchiya et al. | |
| 5,481,706 A * | 1/1996 | Peek | 710/200 |
| 5,511,178 A | 4/1996 | Takeda et al. | |
| 5,560,018 A | 9/1996 | Macon, Jr. et al. | |
| 5,768,610 A | 6/1998 | Pflum | |
| 5,790,851 A | 8/1998 | Frank et al. | |
| 5,845,298 A | 12/1998 | O'Connor et al. | |
| 5,923,880 A | 7/1999 | Rose et al. | |
| 5,991,845 A | 11/1999 | Bohannon et al. | |
| 6,000,028 A | 12/1999 | Chernoff et al. | |
| 6,108,757 A | 8/2000 | Arshad | |
| 6,139,198 A | 10/2000 | Danforth et al. | |
| 6,269,436 B1 | 7/2001 | Tran et al. | |
| 6,324,686 B1 | 11/2001 | Komatsu et al. | |
| 6,427,234 B1 * | 7/2002 | Chambers et al. | 717/140 |
| 6,446,149 B1 | 9/2002 | Moriarty et al. | |
| 6,694,507 B2 | 2/2004 | Arnold et al. | |
| 6,704,862 B1 * | 3/2004 | Chaudhry et al. | 712/244 |
| 6,738,778 B1 | 5/2004 | Williamson et al. | |

(Continued)

OTHER PUBLICATIONS

Robert Muth et al., "Code Specialization Based on Value Profiles", 2000, springer-Verlag Berlin Heidelberg, pp. 340-361.*

(Continued)

*Primary Examiner*—Wei Y Zhen
*Assistant Examiner*—Lanny Ung
(74) *Attorney, Agent, or Firm*—Marcia L. Doubet

(57) ABSTRACT

Optimizations are programmatically applied by a compiler (preferably, a just-in-time or "JIT" compiler), and enable achieving improved performance while a variable acts as a global constant, yet also allow code to execute correctly if the global constant's run-time value changes from the value on which the optimization was originally based. Code snippets that dynamically patch executable code are described, where these code snippets take corrective actions to enable correct program execution following a run-time change to the value of a glacial constant. A backup recovery path may also be maintained, where this path provides code that is executed in the event of a change to a glacial constant and that treats the glacial constant as a variable. Recompilation may also be used after a change to a glacial constant, where the originally-compiled code has made an assumption about the glacial constant's value that is no longer accurate. Combinations of these approaches may be used.

34 Claims, 13 Drawing Sheets

U.S. PATENT DOCUMENTS

| | | | |
|---|---|---|---|
| 6,738,965 | B1 | 5/2004 | Webster |
| 6,842,853 | B1 | 1/2005 | Bush et al. |
| 6,934,832 | B1 | 8/2005 | Van Dyke et al. |
| 7,007,005 | B2 | 2/2006 | Rautenback et al. |
| 7,185,337 | B2 | 2/2007 | Stoodley et al. |
| 7,698,697 | B2 | 4/2010 | Grcevski et al. |
| 2002/0042807 | A1 | 4/2002 | Thomas et al. |
| 2002/0073063 | A1 | 6/2002 | Faraj |
| 2002/0166016 | A1 | 11/2002 | Stoodley et al. |
| 2003/0070161 | A1 | 4/2003 | Wong et al. |
| 2003/0086620 | A1 | 5/2003 | Lucco |
| 2003/0159133 | A1 | 8/2003 | Ferri et al. |
| 2004/0068716 | A1 | 4/2004 | Stevens |
| 2004/0078691 | A1 | 4/2004 | Cirne et al. |
| 2004/0103404 | A1 | 5/2004 | Naumovich et al. |
| 2006/0200809 | A1 | 9/2006 | Grcevski et al. |

OTHER PUBLICATIONS

Tony Chao, "Jet: An Application of Partial Evaluation in Dynamic Code Generation for Java", May 2000.*

Calder, et al. "Value Profiling and Optimization", 1999, Journal of Instruction-Level Parallelism, pp. 1-37.

Autrey and Wolfe, "Initial Results for Glacial Variables Analysis", 1998, International Journal of Parallel Programming, vol. 26, No. 1, pp. 43-64.

Suganuma, et al. "A Dynamic Optimization Framework for a Java Just-in-Time Compiler", 2001, ACM, pp. 180-194.

Whaley, "Dynamic Optimization Through the Use of Automatic Runtime Specialization", May 1999, Master thesis of Department of Electrical Engineering and Computer Science, Massachusetts Institute of Technology, pp. 1-144.

Frank Tip and Peter F. Sweeney, "Class Hierarchy Specialization", 1997 ACM, pp. 271-281.

David Evans, "Lecture 12: Subtyping and Inheritance", University of Virginia, Oct. 2003: retrieved from "http://www.cs.virigina.edu/cs201/lectures/lecture12.ppt/" on Oct. 8, 2007.

Peter F. Sweeney and Frank Tip, "Extracting Library-Based Object-Oriented Applications", 2000 ACM, pp. 98-107.

Kevin A. Stoodley et al., U.S. Appl. No. 09/867,362, filed May 29, 2001, Office Action, Apr. 8, 2004, 7 pages.

Kevin A. Stoodley et al., U.S. Appl. No. 09/867,362, filed May 29, 2001, Office Action, Apr. 20, 2004, 9 pages.

Kevin A. Stoodley et al., U.S. Appl. No. 09/867,362, filed May 29, 2001, Notice of Abandonment, Sep. 1, 2005, 2 pages.

Kevin A. Stoodley et al., U.S. Appl. No. 09/867,362, filed May 29, 2001, Petition Decision, Jun. 1, 2006, 2 pages.

Kevin A. Stoodley et al., U.S. Appl. No. 09/867,362, filed May 29, 2001, Petition Decision, Aug. 1, 2006, 1 page.

Kevin A. Stoodley et al., U.S. Appl. No. 09/867,362, filed May 29, 2001, Examiner's Interview Summary, Oct. 26, 2006, 1 page.

Kevin A. Stoodley et al., U.S. Appl. No. 09/867,362, filed May 29, 2001, Notice of Allowance, Oct. 26, 2006, 4 pages.

Nicola Grcevski et al., U.S. Appl. No. 11/071,026, filed Mar. 3, 2005, Office Action, Oct. 17, 2007, 23 pages.

Nicola Grcevski et al., U.S. Appl. No. 11/071,026, filed Mar. 3, 2005, Office Action, Apr. 9, 2008, 21 pages.

Nicola Grcevski et al., U.S. Appl. No. 11/071,026, filed Mar. 3, 2005, Office Action, Sep. 18, 2008, 13 pages.

Nicola Grcevski et al., U.S. Appl. No. 11/071,026, filed Mar. 3, 2005, Advisory Action, Dec. 10, 2008, 3 pages.

Nicola Grcevski et al., U.S. Appl. No. 11/071,026, filed Mar. 3, 2005, Pre-Appeal Brief Conference Decision, Jan. 21, 2009, 3 pages.

Nicola Grcevski et al., U.S. Appl. No. 11/071,026, filed Mar. 3, 2005, Office Action, Apr. 16, 2009, 12 pages.

Nicola Grcevski et al., U.S. Appl. No. 11/071,026, filed Mar. 3, 2005, Notice of Allowance, Nov. 24, 2009, 6 pages.

* cited by examiner

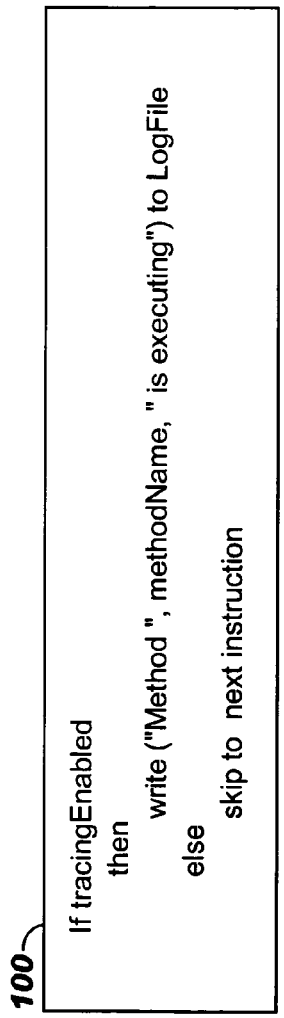

| 0100: | previous compiled instruction ... |
|---|---|
| 0104: | use glacialConstant_123 |
| 0108: | next compiled instruction ... |

| 0100: | previous compiled instruction ... |
|---|---|
| LoopLabel: | JMP LoopLabel |
| 0108: | next compiled instruction ... |

FIG. 7

```
700
  class Tracer {
710  static boolean _tracingEnabled=false;

public final boolean enabled()  { return _tracingEnabled; }
  public void enableTracing()     { _tracingEnabled = true; }
  public void disableTracing()    { _tracingEnabled = false; }
  } public void trace(String s);
  };
```

1100

```
If staticField_123 == null
    then
        throw exception ("staticField_123 not initialized");
```

FIG. 13

```
1300
        Method1:
1310         ; do some work

1320         ; expression that uses glacial constant, or, a self-loop

1330         ; do some more work 1340         return

1350 Snippet1:
1351         ; code to evaluate child nodes
1352         ; code to store new glacial constant value
1353         ; code to store instruction that uses glacial constant value
1354         return
```

FIG. 14

```
1400
        Method2:
1410            ; do some work 1420            nop            ; self-loop and JMP patches go here 1430    Label_X: ; entry to expected, "normal", path 1440            return 1450    Snippet2:
1451            ; code to evaluate child nodes
1452            ; code to compare resulting jump-to location to
                ;                  location in goto node
1453            ; upon equal, code to patch self-loop back to no-op and return
1454            ; else, code to store a JMP instruction,
                ;                  with new jump-to location, over the self-loop
1455            return
```

FIG. 15

```
1500
        Method3:
1510            ; do some work 1520            nop              ; self-loop and JMP patches go here 1530            ; code for executing expected, "normal", path 1540            return 1550 Snippet3:
1551            ; code to evaluate child nodes
1552            ; code to compare resulting exception result to
                ;             previous result in first child node
1553            ; upon equal, code to patch self-loop back to no-op and return
1554            ; else, code to store a JMP instruction,
                ;             with new jump-to location. over the self-loop
                return
1555            ; code to perform a throw statement
                return
```

PROGRAMMATIC COMPILER OPTIMIZATION OF GLACIAL CONSTANTS

CROSS-REFERENCE TO RELATED APPLICATIONS

The present invention is related to commonly-assigned, co-pending U.S. patent application Ser. No. 11/071,026, filed Mar. 3, 2005 now U.S. Pat. No. 7,698,697), which is titled "Transforming Code to Expose Glacial Constants to a Compiler" and commonly-assigned, co-pending U.S. patent application Ser. No. 09/867,362, filed May 29, 2001 (now U.S. Pat. No. 7,185,337), which is titled "Efficient Locking for Thread-Safe Self-Modifying Code", both of which are hereby incorporated herein by reference.

BACKGROUND OF THE INVENTION

The present invention relates to computer programming, and deals more particularly with techniques for compilers to generate code involving data that is not constant, but is unlikely to change except in relatively infrequent situations.

A compiler may alter or manipulate the assembly language code it generates in an attempt to optimize aspects of the application, such as its run-time performance. Such compilers are referred to as optimizing compilers, and are known in the art. One example is the Java™ Just-In-Time ("JIT") compiler. ("Java" is a trademark of Sun Microsystems, Inc.)

A number of the variables used in a particular application program may actually have constant values across a particular execution of the program, or the values may change only very infrequently. Such variables are commonly called "glacial constants". An example of such a value is a variable indicating whether tracing or debugging has been enabled: usually such functionality is disabled, unless a problem occurs. Accordingly, although compare-and-branch logic is provided in the compiled application to account for possible differing values of the variable, a majority of run-time behavior exercises a single destination for these branches.

Because the value of a glacial constant might change during the program's execution, existing compilers rarely do much to optimize uses of these variables. One known optimization is to generate specialized code for particular values of the variable, controlled by an "if" statement. If the specialized code is faster than the general code, then the cost of the "if" statement (e.g., accessing and loading a value, performing a comparison with the value, and branching on the comparison result) might be acceptable. However, the "if" statement does introduce a branch into the code that the processor will have to correctly predict to achieve the highest run-time performance. That branch occupies a slot in the processor branch history table that could be used to predict other branches in the application. This use of a branch prediction slot for branches determined by variables that act as glacial constants (and are thus easily predicted) therefore reduces the effectiveness of the processor's branch prediction resources.

Another specialization that might be possible is if the glacial constant is used to control an "if" statement itself. See, for example, the pseudocode sample in FIG. 1, where the variable "tracingEnabled" is a Boolean indicating whether tracing has been enabled for the executing code. Such statements cannot be optimized in the above way, however, because the "if" statement is already the test for the right values of the constant.

BRIEF SUMMARY OF THE INVENTION

The present invention defines techniques for enabling compilers to generate optimized code involving data that is not constant, but is unlikely to change except in relatively infrequent situations.

In one aspect, the present invention preferably comprises a computer-implemented method that selects at least one variable for which a value thereof will be treated as a glacial constant in the compiler-generated code; for each selected variable, creates optimized compiler-generated code for each of at least one methods comprising source code that references the selected variable, wherein the optimized compiler-generated code treats the value as the glacial constant by generating the code as if the value is a particular constant value for that selected variable; and provides a programmatic run-time adjustment capability for the created optimized code in case the value of any of the selected variable changes to a different value than the particular constant value for which the optimized code was created.

This aspect may further comprise identifying, while creating the optimized code, each location in the created code where the value of each of the selected variables may be changed; programmatically marking each of the identified locations, thereby enabling the provided programmatic run-time adjustment capability to be invoked at run-time when any of the identified locations is encountered; registering, for each of the identified locations, information for use in invoking the provided programmatic run-time adjustment capability; detecting, at run-time, that one of the identified locations is encountered; and responsive to the detection, using the registered information to dynamically invoke the provided programmatic run-time adjustment capability.

In one preferred approach, code snippets are associated with each of the locations, where these code snippets specify code capable of performing run-time adjustments and are dynamically invoked when the locations are encountered.

Embodiments of the present invention may also, or alternatively, be provided as systems or computer program products.

The present invention will now be described with reference to the following drawings, in which like reference numbers denote the same element throughout.

BRIEF DESCRIPTION OF THE SEVERAL VIEWS OF THE DRAWINGS

FIG. 1 provides sample pseudocode illustrating use of a glacial constant that controls an "if" statement;

FIG. 2 provides a sample data structure that may be used to register information pertaining to glacial constants with the JIT run-time;

FIGS. 6A and 6B illustrate use of self-loop patching whereby an original code block is programmatically patched to include a self-loop;

FIG. 7 depicts a sample method that specifies a static field, which may be considered as a possible glacial constant;

FIG. 13 depicts (in an abstract manner) assembly language code for a sample method that references a glacial constant in an expression, showing how a programmatically-generated code snippet may be added thereto;

FIG. 14 depicts (in an abstract manner) assembly language code for a sample method that references a glacial constant in a control flow decision, showing how a programmatically-generated code snippet may be added thereto;

FIG. 15 depicts (in an abstract manner) assembly language code for a sample method that references a glacial constant in exception-checking code, showing how a programmatically-generated code snippet may be added thereto.

DETAILED DESCRIPTION OF THE INVENTION

Figure 3:
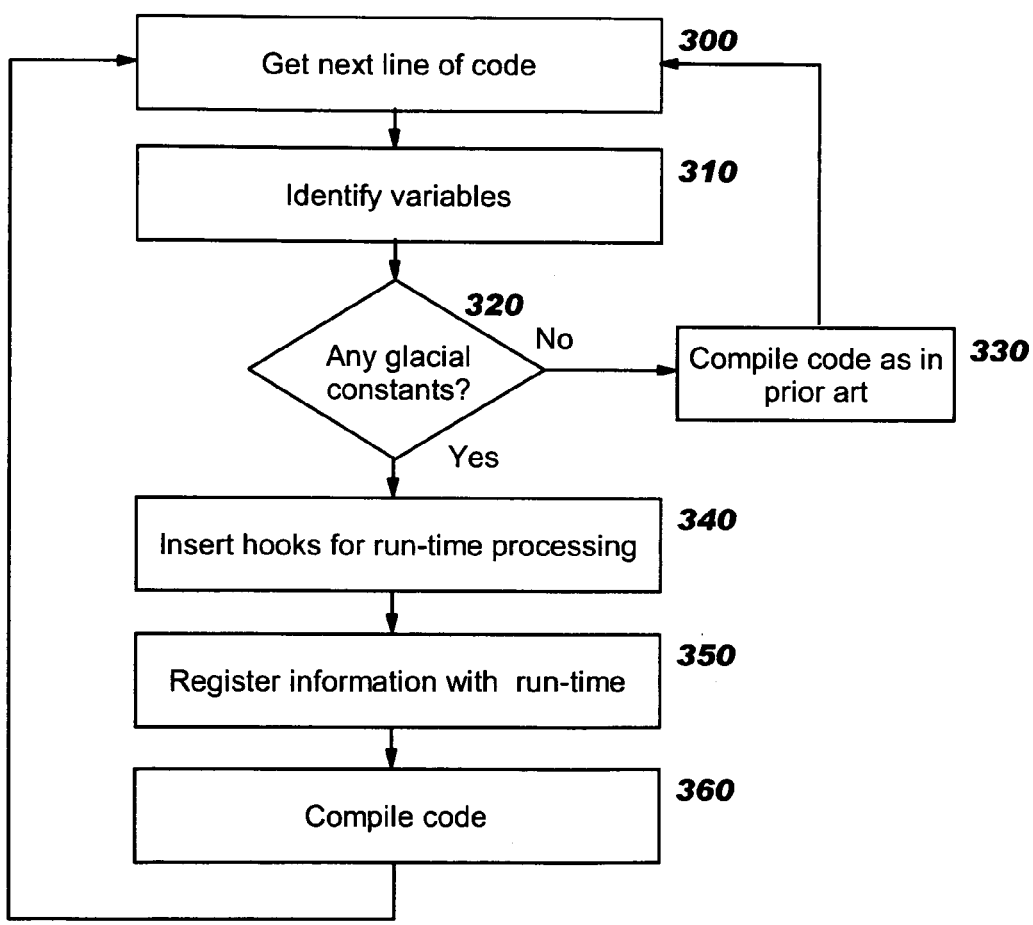
FIG. 3 provides a flowchart illustrating compile-time logic that may be used when implementing preferred embodiments of the present invention.

Using techniques disclosed herein, optimizations are programmatically applied by a JIT compiler, and enable achieving improved run-time performance even though the constant's value may change from the value on which the optimization was originally based. Notably, preferred embodiments not only address the main code generation issues that take the optimizations into account, but also deal with situations where the glacial constant's value changes, as will be described.

There are many examples of optimizations performed by static and dynamic compilers. Loop versioning is an optimization that creates two copies of a loop, where an "if" statement controls which copy is entered (based on the values of variables). One of the loops is maintained as the original loop code. The second copy is optimized for certain values of those variables. For example, the "if" statement might select values of the variables such that an array bounds check will never generate an exception. In this case, the second copy of the loop does not require bounds check instructions, and it can therefore execute much faster than the original (i.e., non-optimized) loop.

A compiler can often generate faster sequences of instructions when it knows the value of a variable. The generated code for operations like memory copies or memory scans, for instance, can be highly optimized for small (or large) constant lengths, for particular data alignment, and/or for non-overlapping copies.

In preferred embodiments, glacial constants are identified in the optimizing compiler (also referred to herein as a "JIT compiler"), as will be described in detail herein. When uses of these variables are encountered while compiling a method, the value of those variables is assumed to be a particular value (where this value is preferably determined by inspecting the class). Code paths that modify the value of a glacial constant are programmatically marked, and whenever one of these paths is executed, the JIT run-time library (also referred to herein as the "JIT run-time") is called to make adjustments that may be required, based on the new value.

According to preferred embodiments of the present invention, optimizations that are performed for variables that operate as glacial constants include: simplifying expression computations; eliminating statements that direct control flow (such as "if" statements and/or "switch" statements); and eliminating exception checks. (Alternative embodiments may implement individual ones of these optimizations, or combinations thereof, without deviating from the scope of the present invention, nor is this list of optimizations exhaustive.) Preferably, special code "snippets" (discussed in more detail below) are created for each use of a glacial constant. These code snippets execute at run-time to re-evaluate the context in which the variable is used so that, if the value of the glacial constant changes, a determination can be made dynamically as to whether the generated code is still correct (and if not, the generated code can be dynamically patched under control of the snippet). The functions of the snippets, in preferred embodiments, preferably comprise:

For an expression, the snippet computes the new value of the expression (taking into account the glacial constant's new value) and then patches that new value directly into the code.

For an "if" statement, the snippet computes the new value of the condition and, if the direction of the "if" statement has changed, patches a jump instruction into the code that directs control to the correct code path. (Other flow-directing statements, such as "switch" statements, may also be addressed by preferred embodiments, as described in more detail below.)

For a removed exception check, the snippet evaluates the check and throws the exception, if needed.

Each snippet is registered with the JIT run-time and associated with the glacial constant on which it is based. In addition, the point in the compiled method where the snippet's action is required is stored by the run-time. See FIG. 2 for a sample data structure 200 that illustrates this stored information. In this sample data structure, two snippets 210, 220 for patching "if" statements are registered, along with one snippet 230 for patching expressions and another snippet 240 for patching exception checks. (Human-readable identifiers have been used in data structure 200 for illustrative purposes.)

According to preferred embodiments, hooks are inserted by the JIT compiler, during compilation, upon detecting code that may change a glacial constant's value. These hooks enable invoking the JIT run-time when any of the code paths is entered. See FIG. 3, which provides a flowchart illustrating this compile-time processing. (See also FIG. 8, which illustrates logic that may be used when implementing Block 320 of FIG. 3.)

In a Java environment, one example of a potentially troublesome code path that may modify a glacial constant is code that employs the reflection capability of the Java language to change the value of a glacial constant without accessing it directly. By implementing appropriate hooks into the run-time support needed for the Java reflection capabilities, preferred embodiments can detect when a glacial constant is changed via this mechanism. The JIT run-time support can then be invoked to update any generated code that relies on the value of the glacial constant.

Figure 4:
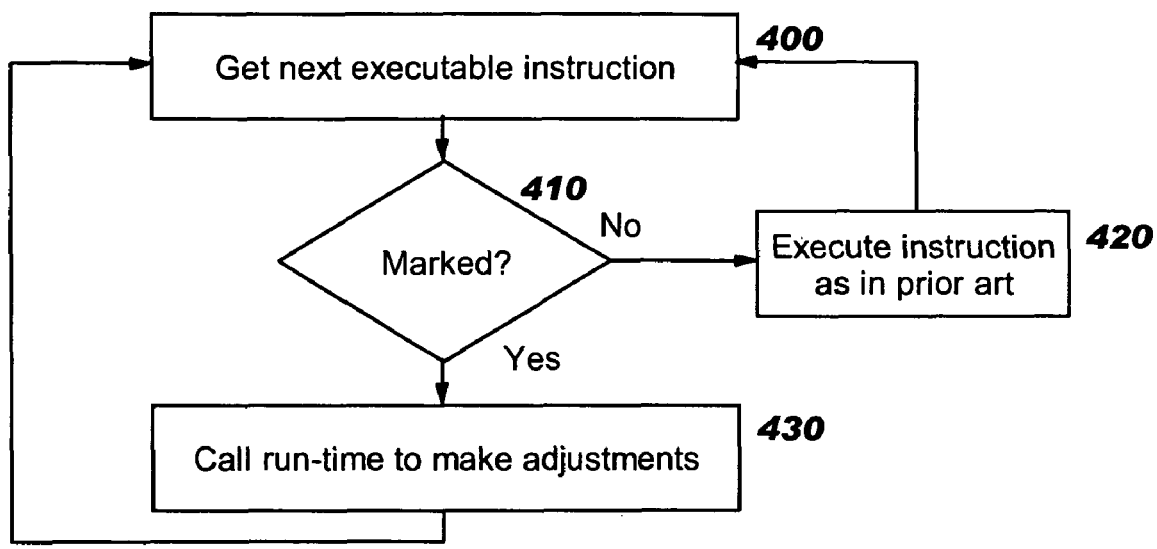
FIG. 4 provides a flowchart illustrating run-time logic that may be used when implementing preferred embodiments of the present invention.

In preferred embodiments, the JIT run-time uses the code path marking information (as illustrated by FIG. 2), upon detecting that a glacial constant's value has changed (either because one of the marked code paths has been entered or because the glacial constant has been changed via reflection), to make any required adjustments. See FIG. 4, which provides a flowchart illustrating this run-time processing. (The manner in which the required adjustments may be made is described in more detail below. See, for example, the discussion of FIGS. 13-15.)

In preferred embodiments, when the JIT run-time is informed that a code path has been entered whereby a glacial constant's value may be changed, it first patches a self-loop at all of the code locations where the glacial constant has been assumed to be a particular value. (These locations may be determined by consulting the information previously registered with the run-time, as illustrated by FIG. 2.) This self-loop technique protects other threads that might be executing the code, so that they do not use an inconsistent value for the glacial constant. Then, the run-time calls each of the code snippets associated with those code locations, according to the registered information for that glacial constant. See FIG. 5, where this run-time processing is illustrated. (It should be noted that, rather than using self-loops, an alternative approach may be used whereby the threads are signaled to stop via a cooperative suspend mechanism. This approach may be advantageous, for example, when multiple instructions need to be atomically updated. The manner in which this alternative approach may be substituted for the self-loops described herein will be obvious to those of skill in the art, given the teachings provided herein.)

Figure 5:
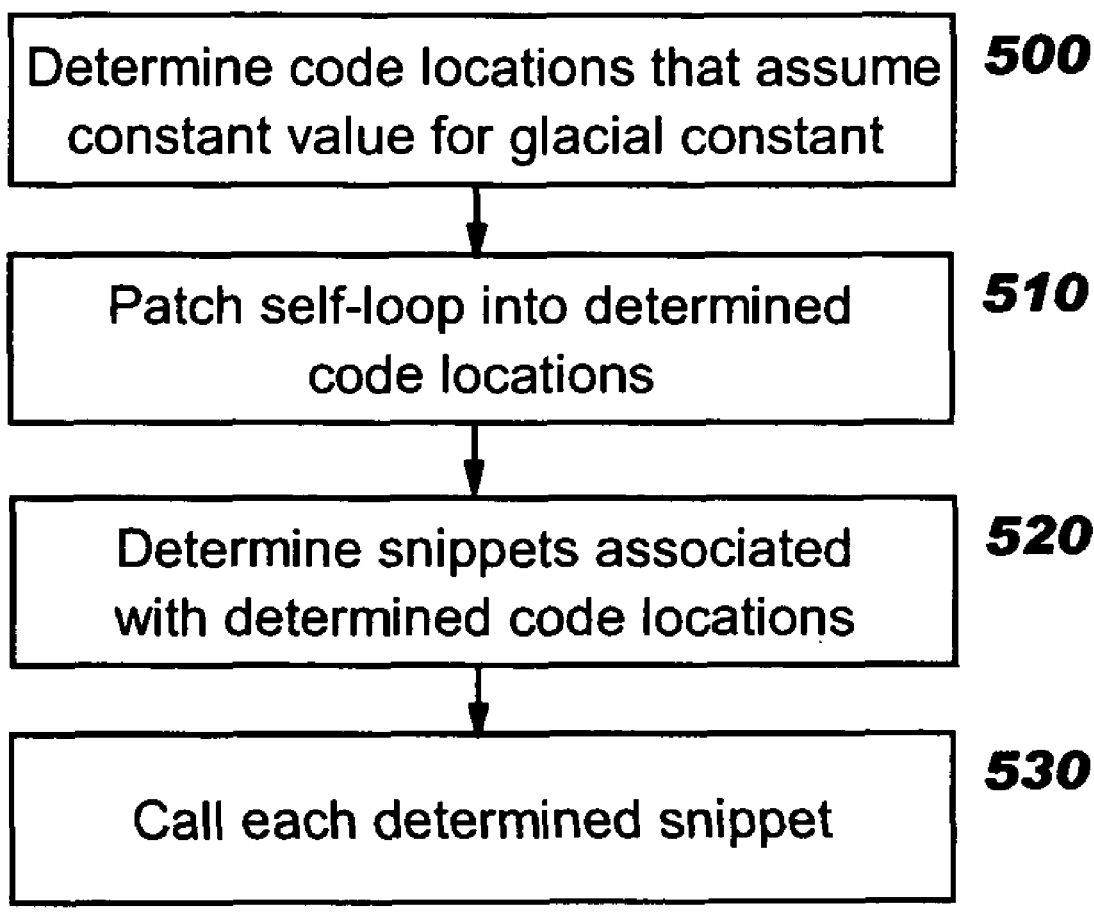
FIG. 5 provides a flowchart illustrating operations performed by the JIT run-time, in preferred embodiments of the present invention, when it is informed that a code path has been entered whereby a glacial constant's value may be changed.

Preferably, the snippets invoked from FIG. 5 (see Block 530) make any corrections necessary (according to the type of snippet) and may then replace the self-loops with the original (or adjusted) code. (The manner in which the code snippets execute is described in more detail below. See, for example, the discussion of FIGS. 13-15.)

The run-time code patching technique leveraged by preferred embodiments, whereby a self-loop is temporarily patched into executing code while creating other code patches and is then subsequently replaced, is known in the art and is used by JIT compilers to perform a variety of modifications to previously-generated code, such as virtual guard patching, unresolved method invocation targets, and polymorphic inline cache updating. (Use of self-loops for, patching code involving glacial constants as disclosed herein is not known in the art, however.) The self-loop patching technique used in preferred embodiments is illustrated (in an abstract form) by FIG. 6A, which provides an illustration of an original code block 600 and FIG. 6B, which provides an illustration of that code 600' after programmatic patching to include a sample self-loop 620.

A Boolean value that indicates whether tracing/debugging has been enabled was discussed above as an example of a glacial constant. Everyday applications may contain other types of variables that operate as glacial constants. As an example, for software engineering reasons, well-designed programs are generally written to be parameterizable, whereby one or more input parameters are used to provide a value or values that are initialized when the program starts and are unlikely to change throughout the program's execution (or may change only rarely). Examples of such "constant" values include: any platform-specific settings required to correctly execute an application program; the operating environment of the program (including the applicable time zone, locale, code page, etc.); parameter values that are set based on command-line input (such as problem size; file names; behavioral settings or preferences, such as "use algorithm A or B or C"; etc.); and/or parameter values that are set from the execution environment (such as file paths).

Programs are often designed to function effectively across a broad variety of platforms and environments, as well as supporting various levels of functionality for different types of uses. Supporting all of this functionality requires large amounts of conditional code to do "the right thing" for the current execution of the program. Accordingly, input parameters of the type discussed above may be used within the program's conditional code. These parameter values are often constant for one execution of the program (or across each particular phase of a program's execution), but may be different from execution to execution (or from phase to phase within one execution). For example, once the appropriate locale or time zone has been determined for a particular program execution, that value is unlikely to change while the program executes; however, upon a subsequent execution of the same program, the value may be different (yet unchanged during that subsequent execution).

Using techniques disclosed herein, a JIT compiler can programmatically optimize the code that uses these "mostly-constant" values, so that the program is effectively specialized for each execution or each phase, according to the values these Variables are set to.

One manner in which variables that might be candidates for glacial constants may be identified will now be described in more detail.

Preferred embodiments presume that the most common forms of glacial constants will be coded as static fields of classes. Accordingly, any static field may be considered as a possible glacial constant. (See FIG. 7, where a static field 710 is specified in sample method 700.) Preferred embodiments rely on knowledge of all code locations that might modify such a field. This knowledge is easier to collect if the field also has private access, meaning that only methods in the same class can access the field. However, preferred embodiments do not limit use of the techniques disclosed herein to only private static fields. Rather, a hook inside the class loader can be used to collect information about locations where static fields are modified. And, as discussed earlier, preferred embodiments also use hooks placed within the reflection capabilities that are built into the Java virtual machine to detect situations where a program modifies the value of a glacial constant without directly referencing that field.

It is also possible to identify, at class load time, classes that are examples of the singleton design pattern where only one object of the class exists at any one time. Classes identified in this manner can be instrumented to verify dynamically that the class is, in fact, a singleton. Preferably, until the singleton design pattern is disproved, all of the object's fields can also be considered as candidate glacial constants.

Note that, while it is possible to assume that a field of an object is a constant, this assumption is much less likely to be true across all objects of a particular class (otherwise, the field would likely be declared as static rather than as an instance field). Nonetheless, there is no fundamental reason why an instance field could not be considered to be a glacial constant at particular code locations. Accordingly, alternative embodiments may identify instance fields as potential glacial constants. (Accordingly, while discussions herein refer primarily to "static fields", it should be noted that this is by way of illustration and not of limitation.)

It may happen that not all static fields are constant "enough": some may be modified too often to be profitably considered as glacial constants. For this reason, preferred embodiments may use a variety of further (or different) conditions to select which variables will be optimized as glacial constants. Several such conditions will now be discussed, by way of illustration but not of limitation.

In one approach, a static measure is used to predict whether a static field will be suitable as a glacial constant, comprising counting the number of code locations where the static field could be modified. This count may then be compared to a threshold value. Optionally, a slightly more dynamic count may be kept by including locations where a method that can modify the field has been in-lined into another method. Other static measures are also possible.

Instead of static measures, dynamic heuristics may be used alternatively to identify static fields that are suitable for optimization as glacial constants. (Or, a combination of static and dynamic measures may be used without deviating from the scope of the present invention.)

One simple dynamic measure is to examine the number of times methods that modify the static field have been executed. The Java virtual machine typically collects these counts as part of the compilation mechanism; therefore, no additional overhead will be incurred to compute this dynamic measure. This measure, however, does not typically take into account executions of the method after compilation or executions of copies of the method that have been in-lined into another method. It may therefore suggest some static fields as suitable glacial constants when, in fact, the value changes more frequently than would be desirable.

Figure 8:
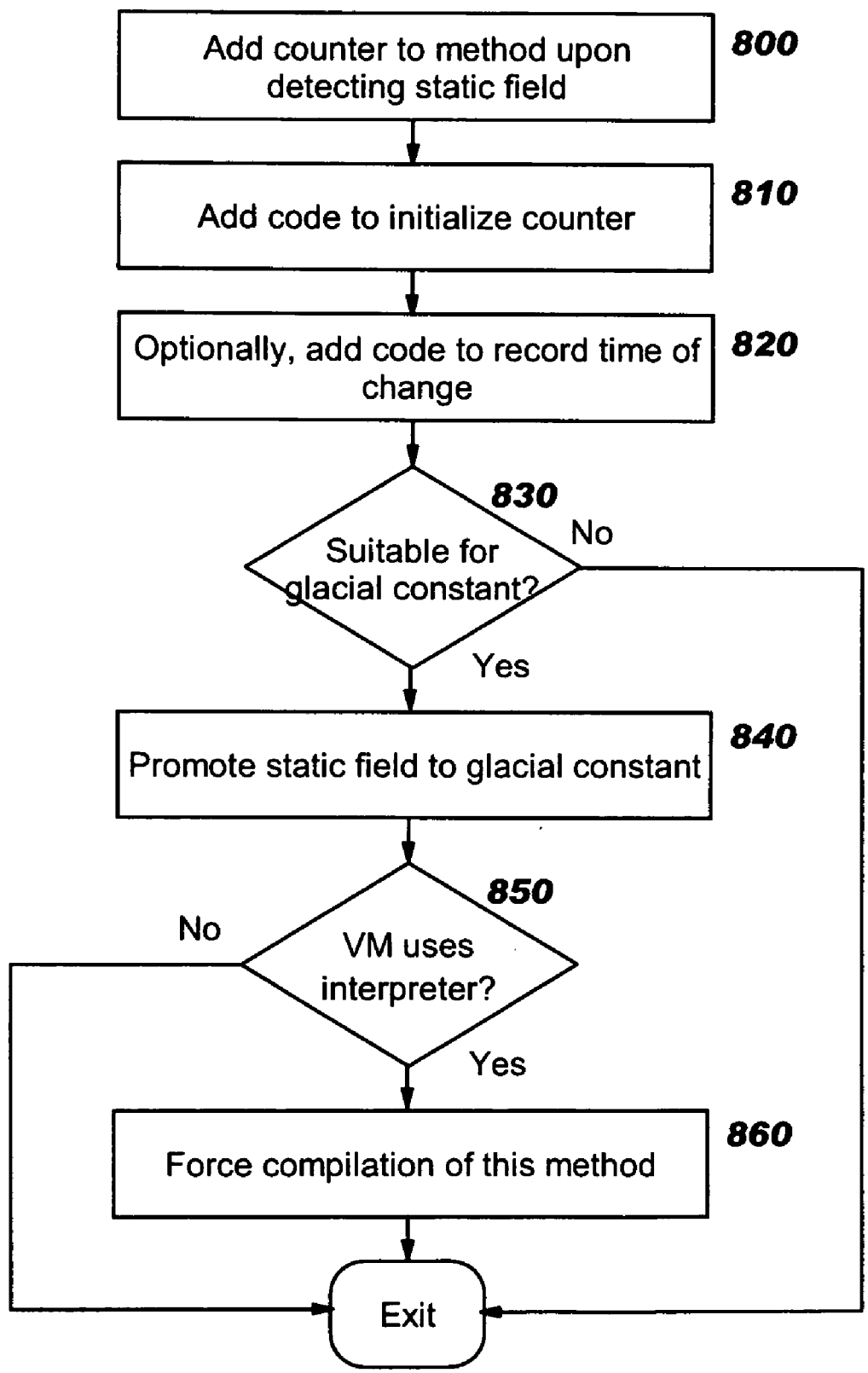
FIG. 8 provides a flowchart depicting logic that may be used at compile time when processing glacial constants.

Referring now to FIG. 8, a flowchart is provided that illustrates logic which may be used by preferred embodiments when determining whether a static field should be treated as a glacial constant, and how the JIT compiler might react to identification of such static fields, as will now be described.

Preferred embodiments may compute a measure using a small overhead in the PUTSTATIC bytecode. Notably, this bytecode is the only mechanism whereby the value of a static field can be directly changed. (Static fields may also be modified using the reflection capability of the Java language, and these modifications cannot be counted by instrumenting the PUTSTATIC bytecode.) Preferably, one or more static count fields are programmatically added to each class, one count field per original static field in the class (Block 800). These counts are initialized to zero (Block 810) and are incremented every time a PUTSTATIC bytecode is executed on the corresponding static field of the class. The underlying mechanisms within a Java virtual machine that support the reflection capability may also be instrumented to update these counts.

As one alternative to this counter, a Boolean flag or bit could be used to detect that a static field's value has changed. However, since each static field's value will almost certainly be changed when the static initializer for the class executes, use of an actual counter is preferable to use of a Boolean flag.

As yet another alternative, rather than a counter, the time the static field was last changed could be recorded. Or, the time of the most recent change may be recorded (Block 820) in addition to counting the number of changes. It should be noted that the actual time of day need not be recorded: any number that tracks time in some regular fashion can be used. As one example, in a virtual machine that uses cooperative suspend mode, where all threads must periodically poll to see if they should suspend themselves for, say, a garbage collection cycle, then time can be (at least coarsely) approximated by the number of global suspends (which can be easily tracked by the virtual machine). If the last time a field was changed was several global suspend cycles ago, for example, then the field is more likely to be a glacial constant than if it has been modified following the last global suspend. (Note that the counters and optional time recording information referenced in Blocks 800-820 are merely one manner in which candidates for use as glacial constants may be identified, and preferred embodiments are not limited to this approach.)

Accordingly, by collecting information about changes to static fields, the JIT compiler can then evaluate which static fields might be suitable as glacial constants. Upon compiling a method where treating a static field's value as a constant might significantly improve the execution time of a method, the JIT compiler may choose (Block 830) to promote that static field to the status of glacial constant (Block 840) if it does not appear that the field's value will change often.

In preferred embodiments, if the virtual machine ("VM") makes use of an interpreter (Block 850), the impact to the interpreter for optimizing a glacial constant is reduced by the JIT compiler forcing compilation (Block 860) of any method that modifies any field that has been identified as a glacial constant. (Therefore, the interpreter need not know anything about glacial constants.)

As noted earlier, three major situations (or some combination thereof) are addressed by preferred embodiments for optimizing code involving a static field that has been identified as a glacial constant, and these comprise using a glacial constant to: 1) compute the value of an expression; 2) direct control flow; (e.g., via an "if" statement) or 3) decide whether an exception should be thrown. Each of these situations will now be discussed in more detail, describing how the original code may be optimized when the static field is treated as a glacial constant.

To simplify the presentation, discussions of these three situations assume a tree-based IL used by the compiler to represent the operations used to execute the compilation unit (typically, a method). (Note, however, that this is by way of illustration and not of limitation, and should not be interpreted to mean that the scope of the present invention is limited to compilers that use a tree-based IL.) In a tree-based IL, individual operations are referred to as nodes, and the operands of the operation are depicted as children of the operation node.

Referring now to the first of the three situations to be optimized in preferred embodiments, use of glacial constants in expressions, it will be understood that a glacial constant used when evaluating an expression results in a simpler expression (as contrasted to use of a static field in the expression). This is because the glacial constant will not be loaded from a static field: its constant value will be used. This reduces memory traffic and may even lead to further expression simplification if the other operands of the expression are also constants. And, the JIT compiler may be able to prove that the values of the other operands fall into ranges such that, when the glacial constant's value is known, the result of the expression can be known.

An example of this last optimization would be an integer division expression where the dividend is known via earlier analysis to be both positive and less than some value, say 15. If the divisor is a glacial constant with value 30, then the result of the expression is therefore known to be zero. Preferred embodiments do not completely remove the code for loading the static field, as would be done if its value was truly a constant, however, because the value of the field may change at some later time. Preferred embodiments therefore maintain the expressions that depend on the glacial constant so that these expressions can be re-evaluated if the glacial constant's value changes. The expressions are maintained, according to preferred embodiments, in such a way as to improve performance of the code that uses the glacial constant between modifications. (In some cases, performance may be significantly degraded, at least temporarily, when a glacial constant is modified. Care should therefore be taken to identify candidates for glacial constants which will use their predicted constant value much more often than they are modified.)

In preferred embodiments, a new type of expression node is created in the tree-based IL. This expression node is referred to herein as a "glacialConst" node. In preferred embodiments, glacialConst nodes look like constant nodes, except that these nodes have an expression tree below them that computes the value of the expression using a variable value for the static field. It is this expression tree that will be used to generate code to re-evaluate the expression's value if the glacial constant's value changes. To the rest of the optimizer and all subsequent optimization passes, the glacialConst node simply appears to be a constant value. (As an exception, if expression folding that involves a glacialConst node occurs, the result of the folding is preferably another glacialConst node, rather than a regular constant node, in preferred embodiments.)

Figure 9:
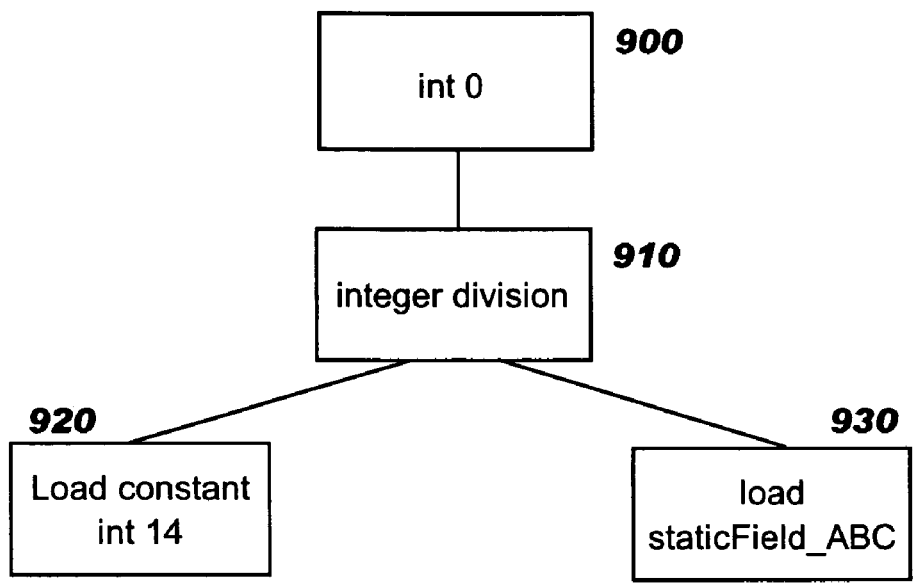
FIG. 9 depicts, using a tree-based intermediate language ("IL") with which a compiler represents operations used to execute a compilation unit, a representation of an expression that contains a glacial constant.

See FIG. 9, where a sample glacialConst node 900 and corresponding expression tree comprising nodes 910-930 are illustrated (in an abstract manner) for an example expression that includes a glacial constant. More specifically, this example expression computes integer division using a constant dividend value of 14 and, as a divisor, a glacial constant that is named "staticField_ABC" and that is assumed (during optimization) to have a value of 30. Accordingly, the simplified expression represented by glacialConst node 900 is illustrated as having an integer value of zero, the operand is illustrated in child node 910 as integer division, and this node 910 has as its children dividend illustrated in child node 920 as a loading operation of a constant integer value of 14 and a divisor illustrated in child node 930 as a loading operation on the static field "staticField_ABC".

Referring next to the second of the three situations to be optimized in preferred embodiments, use of glacial constants used to direct control flow, preferred embodiments comprise optimizing control flow decisions represented by "if" statements as well as decisions represented by "switch" statements, or statements having similar semantics. (Alternative embodiments may optimize a subset of these statements, such as only "if" statements or only "switch" statements, without deviating from the scope of the present invention.) A static field's value may be used to determine whether the "then" portion of an "if" statement executes or, instead, whether the "else" portion of the "if" statement executes. Or, the static field's value may be used in a "switch" statement to control multiple alternative code paths. When a static field used to direct control flow is promoted to a glacial constant, the conditional checks need not be executed and potentially large amounts of code (corresponding to non-entered paths) will no longer execute. Preferred embodiments do not completely remove this code, because the glacial constant's value may change in the future, in which case a control flow path that is different from the one for which the code has been optimized may need to be executed.

In preferred embodiments, this situation is addressed as if it were so-called "virtual guard no-op'ing", a standard technique used to improve the effectiveness and efficiency of in-lining the targets of virtual invocations. Preferred embodiments create a new type of expression node in the tree-based IL for this situation, where this new expression node is referred to herein as a "glacialConstGuard" node and has two children. The first child is always a "goto" node that directs flow to the basic block that will execute until the glacial constant's value changes. Note that, according to preferred embodiments, this "goto" node is simply a placeholder to identify the correct fall-through successor of the glacialConstGuard: the "goto" instruction itself will not be executed. The second child is the if-node or switch-node that originally directed control flow based on the static field's value. This second child will be used to re-evaluate the control flow successor when the glacial constant's value changes, such that the program can continue to execute correctly even if assumptions about the glacial constant turn out to be invalid during run-time.

Figure 10:
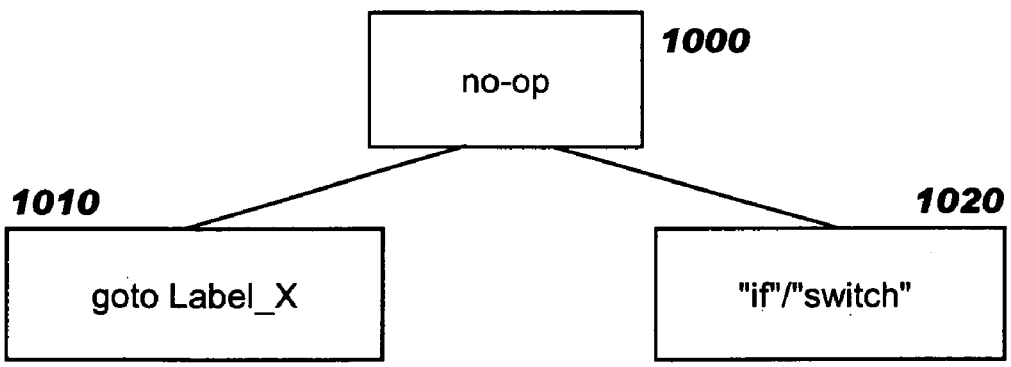
FIG. 10 depicts a tree-based IL representation for a glacial constant that is used in control flow decisions.

See FIG. 10, where a sample glacialConstGuard node 1000 and corresponding expression tree nodes 1010-1020 are illustrated. As shown in FIG. 10, the glacialConstGuard node 1000 is illustrated as being a no-op instruction (i.e., a placeholder that does not represent executable code); the first child node 1010 is shown as a "goto" node that references the location ("Label_X", in this example) where the optimized code begins; and the second child node 1020 is illustrated as representing the original "if" or "switch" statement. (While not shown in FIG. 10, a set of child nodes may also appear underneath node 1020 to represent the original control flow expression.)

In preferred embodiments, subsequent optimizations treat the glacialConstGuard node (1000) as if it is the original control flow node (i.e., as if it is the second child node 1020). However, optimizations can treat the successor identified by the first child (1010) as more important than other successors. In particular, it may be reasonable for subsequent optimizations to simplify code along the path to the "important" successor at the expense of the other paths. Correctness must be maintained during these subsequent optimizations, as will be apparent, but execution speed can be tuned to favor the important successor. (If the glacial constant's value does change, such that code represented by the second, "less important" child node is then executed, a slower execution path may result. Accordingly, it is preferable to carefully balance optimizations of one path over another against the likelihood that the glacial constant's value will change.)

As one example of these subsequent optimizations, the code might be arranged so that the successor chosen by the glacialConstGuard immediately follows the guard. Suppose that the original statement is "if (static==5) go to block10" and the variable named "static" is determined to be a glacial constant with value 5. In this case, it would be preferable to rearrange the code so that "block10" immediately follows the glacialConstGuard. As another example, certain computations may be placed in global registers upon determining that they are used along the path indicated by the glacialConstGuard, even if those computations are not used at all along an alternative path.

Referring finally to the third of the three situations to be optimized in preferred embodiments, use of glacial constants for exception checking, techniques used in preferred embodiments will now be described. When a static field's value is treated as a glacial constant, exception checks such as null checks or bounds checks based on that static field can likely be determined at compile-time to either always throw the exception, or to never throw the exception (depending on how the static field is used within the exception-checking logic). In such cases, preferred embodiments use a technique analogous that to discussed above for glacial constants that are used to determine control flow. That is, a "glacialConstGuard" node with two children is preferably created in the tree-based IL for the exception-checking situation. The first child node represents the behavior that should occur until the glacial constant's value changes. If the glacial constant's value indicates that the exception will not be thrown, for example, then the first child is, in preferred embodiments, an empty node indicating that there is nothing to do. If the glacial constant's value indicates that the exception will be thrown, then in preferred embodiments, the first child is a "throw" expression node. In either case, the second child contains the original exception checking tree (for example, a null check or bounds check).

Figures 11, 12:
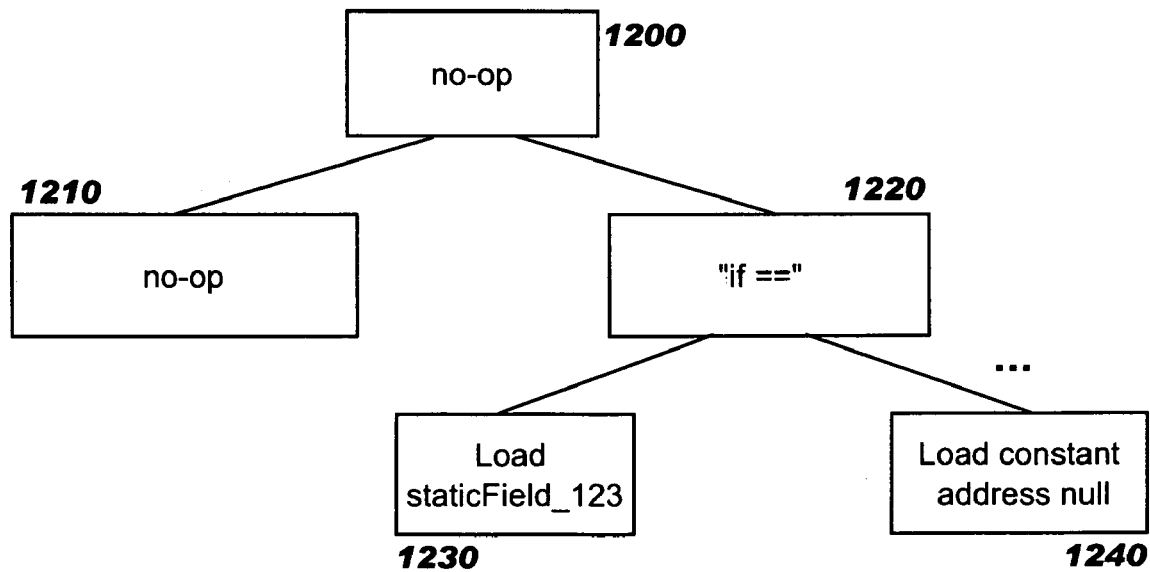
FIG. 11 depicts sample pseudocode that performs exception checking of a static field.
FIG. 12 depicts a tree-based IL representation for this exception checking.

See FIGS. 11 and 12, which illustrate this third optimization situation. In FIG. 11, sample pseudocode 1100 is provided that tests whether a static field "staticField_123" has a null value and, if so, throws an exception. Suppose it is known (or predicted) that the static field, operating as a glacial constant, will have a non-null value. In this case, an exception will not be thrown. A corresponding expression tree is provided in FIG. 12, according to preferred embodiments, where a sample glacialConstGuard node 1200 and its child nodes 1210-1220 are illustrated. The glacialConstGuard node 1200 is illustrated as being a no-op instruction. Because the expected behavior in this example is to not throw the exception, the first child node 1210 is shown as a no-op node that will do nothing. The second child node 1220 is illustrated as representing the original "if==" expression from the example code in FIG. 11. (By way of illustration, a portion of the expression tree corresponding to this child node 1220 is depicted in FIG. 12, comprising child nodes 1230-1240, where these nodes represent the test from the "if" statement in FIG. 11.)

Techniques used in preferred embodiments for code generation will now be described in more detail, and in particular, code generation will be described for the new expression nodes "glacialConst" and "glacialConstGuard" discussed above.

Referring first to glacialConst nodes, in preferred embodiments, whenever the code generator evaluates a glacialConst node, it generates code to use the constant value directly. Preferably, this comprises embedding the constant's value into the instruction stream itself. As an alternative, the constant's value may be computed into a register (e.g., loading low and high halves of the value individually, perhaps, if the target instruction set does not support arbitrary constants). As yet another alternative, the constant value may be stored in a pool of constants associated with the method to be loaded by the code when it is used. Note that, because the value of the constant may change, the instruction that references the constant should use the largest possible field to hold a constant of the static field's type. (For example, the X86 instruction set architecture allows constants of multiple sizes to be referenced inside an instruction. Even if the present value of an integer glacial constant can fit into 2 bytes, the generated instruction should use a 4-byte immediate field, because there is no guarantee that a subsequent value will not require the full 4-byte width of an integer variable.)

A further complication that may be encountered involves a static field that has been privatized into a local variable that is then involved in several different calculations that can be folded into glacial constant expressions. Because the static field has been privatized, any thread that executes this code should use a single value for the glacial constant when performing the calculations. But because there are multiple code locations that must be patched if the glacial constant's value changes, it may be possible in some situations for a thread to execute some of those calculations with the old value of the glacial constant and other calculations with the new value of the glacial constant. Preferred embodiments use one of two approaches to address this problem. In a first approach, the snippet for the actual load of the static field stores the new value into the local variable originally used in the program's source code to privatize the static field. The snippets that re-evaluate the uses of the local variable are then designed to load the local variable, rather than to perform an access to the static field. In a second approach, all threads are asked to stop executing, via a cooperative suspend model, when those expressions need to be patched. So long as no thread can stop between the static field load and the expressions that rely on the value of the static field, then the multiple patches can be accomplished while the threads are stopped without endangering the program's correctness. Determining which of these two approaches is best comprises evaluating the costs of updating the expressions versus the expected frequency with which the glacial constant's value will change.

Regardless of which approach is used for storing the constant into the instruction stream, the tree below the glacialConst node is evaluated, in preferred embodiments, whenever the glacial constant's value changes, and the newly-computed value is then written into whatever location the previously-generated constant occupies. One manner in which this may be accomplished will now be described.

In preferred embodiments, the code generator creates a code snippet comprising code for evaluating the tree underneath the glacialConst node. Recall that this tree refers to the static field using its original code, so as long as the static field's value has been updated with the new value, this snippet will re-evaluate the expression using the new value of the static field. For example, referring to the sample tree 900 in FIG. 9, suppose that the value of "staticField_ABC" has changed from 30 to 14. Accordingly, when the generated code snippet evaluates the expression represented by nodes 910-930, the expression result is now 1 (instead of zero).

FIG. 13 provides a sample method 1300, showing how the programmatically-generated code snippet may be added thereto. In this sample method 1300, the method does some work (1310), then executes an expression (represented at instruction 1320) that uses the glacial constant, does some more work (1330), and then returns (1340). The snippet 1350 is added to this method, using techniques disclosed herein, to enable instruction 1320 to continue operating correctly if the value of the glacial constant changes. As just discussed, the code snippet includes code to evaluate the expression from the child nodes of the glacialConst node. This evaluation is represented in FIG. 13 at 1351 (and, in the example shown in FIG. 9, comprises loading a constant integer 14 and loading the value of the static field "staticField_ABC", followed by an integer division operation).

According to preferred embodiments, the snippet further comprises code to store the new value for the glacial constant into the appropriate location. See 1352 in FIG. 13. As has been discussed, this location may comprise the instruction stream itself, potentially more than one place if the constant is created by parts in a register, or in the constant pool. In addition, the code snippet generated by preferred embodiments includes code to store the instruction that uses the glacial constant at the location where the instruction is originally generated (and in this instruction, the static field reference is replaced by the newly-computed value of the glacial constant). See 1353 in FIG. 13. Since the code generator just generated this instruction, it knows exactly what bytes it needs to store to update that instruction.

The motivation for including code 1353 in the snippet to store the instruction, including the newly-computed value, into the instruction stream is described in more detail below. Briefly, this snippet will be called by the JIT run-time whenever the glacial constant's value changes (see Block 530 of FIG. 5). Before calling the snippet, however, the run-time will patch a self-loop instruction over the instruction that uses the constant value, so that any threads that are currently executing the code will not execute the instruction that loads the constant until the full value of the new constant has been written into the instruction stream (see Block 510 of FIG. 5). With reference to the method in FIG. 13, this self-loop patching overwrites the code at 1320. The snippet can then restore the patched-over instruction, as updated with the new glacial constant value, by executing the store instruction 1353.

Note that, depending on the target architecture and the size of the constant value, updating the constant value (1352 in FIG. 13) and removing (i.e., patching over) the self-loop (1353 in FIG. 13) may both be accomplished by storing a single instruction into the instruction stream.

The final instruction generated in the snippet of preferred embodiments is a return statement. See 1354 of FIG. 13. This is because the snippet will be called by the JIT run-time and, once execution of the snippet is complete, control should be returned to the run-time so that any other snippets that depend on the same glacial constant (as determined using registered information of the type illustrated in FIG. 2) can also be executed. Note that, once the snippet has executed (and thus patched over the self-loop), any threads that were executing the method and that were caught in the self-loop will continue executing through the method. The threads need only wait, via the self-loop, until each constant value is updated before the threads begin making progress again.

Once a snippet's code has been generated at the bottom of a method, its entry address (see 203 in FIG. 2) is preferably recorded along with the glacial constant it depends upon (see 201 in FIG. 2). Preferably, this information is stored persistently in (i.e., registered with) the JIT run-time so that when the glacial constant's value changes, the run-time can find all the snippets that must be executed to update glacial constant values in code generated by the JIT compiler.

Turning now to code generation for the other node type in the tree-based IL, namely the glacialConstGuard nodes, the code generated for a glacialConstGuard node by preferred embodiments is similar to that for a no-op'ed virtual guard. When the glacialConstGuard node of the tree-based IL is evaluated by the code generator, a no-op instruction is first generated into the code being generated for the corresponding method. If the glacial constant's value changes at run-time, the JIT run-time will write a self-loop instruction at the point of this no-op (see Block 510 of FIG. 5), causing execution of the method to be temporarily suspended at that point while the snippet executes (see Blocks 520 and 530 of FIG. 5).

Returning to discussion of the glacialConstGuard node, the code generator then examines the node's first child to see if the guard is for simplified control flow (see FIG. 10) or for simplified exception checking (see FIG. 12). Code generation then continues based upon this first child node.

If the first child is a goto node, then the guard is for simplified control flow (as in FIG. 10). In this case, a code snippet is generated that evaluates the original control flow tree (as represented by the second child node), but rather than redirecting the control flow, preferred embodiments examine the destination of the tree. If the destination of the control flow tree, taking into account the glacial constant's new value, remains the same, then the snippet preferably returns to the run-time after patching over the self-loop with a no-op. If the destination changes, however, then a jump instruction with the new destination code's address is patched at the same location as the original no-op instruction, after which control is returned to the run-time. (Note that because the jump instruction is stored at the same location as the self-loop, there is no further action required to remove the self-loop.)

FIG. 14 provides a sample method 1400, showing how the programmatically-generated code snippet for the control flow optimization may be added thereto. In this sample method 1400, the method does some work (1410), and has a no-op (1420) programmatically inserted to represent the glacialConstGuard node. The method 1400 then includes instructions (see 1430) that comprise the expected, or "normal", path for which the control flow has been optimized. (Notably, control falls through into this normal execution path, according to preferred embodiments.) Preferably, the instructions at 1430 are associated with a label ("Label_X", in the example) which is also specified in node 1010 of FIG. 10. Method 1400 then returns (1440). The snippet 1450 is added to this method, using techniques disclosed herein, to enable the normal execution path instruction that begin at 1430 to be skipped, if that is no longer the correct path to take, based on the newly-determined value of the glacial constant. The manner in which the snippet provides for this skipping will now be described.

The code snippet at 1450 includes code 1451 to evaluate the original control flow expression, as discussed above, where this original expression has been stored in the second child node of the glacialConstGuard node (see 1000 of FIG. 10). (With regard to the second child node, see 1020 of FIG. 10. Nodes for the original expression have been omitted from the figure for ease of illustration, although it will be apparent to one of skill in the art how a subtree of the node at 1020 may be represented.) The code at 1452 of snippet 1450 compares the destination location resulting from the new evaluation of the control flow expression, as revised with the new glacial constant value, to the location used in the expected execution path (and which is represented by the label "Label_X" in node 1010). The code at 1453 of snippet 1450 patches the self-loop (which overwrote the no-op at 1420) back to a no-op, and then returns, if the destination is not changed. Otherwise, the code at 1454 will execute, and writes a JMP instruction over the self-loop that has replaced the no-op at 1420, where this new JMP instruction will jump to the newly-determined destination (and execution of the code at 1430 will therefore be skipped over). The snippet then returns (1455).

On the other hand, if the first child of the glacialConstGuard node is not a goto node, then the guard is for simplified exception checking (as illustrated by FIG. 12). As noted earlier, a no-op instruction has been inserted into the method being compiled. The code in the first child is then generated directly into the code for the method. As discussed earlier, this first child represents the normal path, and if the normal path is to not throw an exception, then the first child is preferably empty.

FIG. 15 illustrates how a programmatically-generated snippet 1550 for the exception check situation may be added to a method 1500. The no-op that is inserted into the method is shown at 1520 (and, in the example method, follows instructions for performing other work 1510). Method 1500 also comprises code 1530 for executing the expected, "normal", path for the exception check (as represented by the first child-node 1210) and, in this example, that code is followed by a return 1540 from the method.

For these exception-check guards, when the value of the glacial constant changes, the exception check is evaluated to take into account the new value of the glacial constant. This evaluation uses the original exception-checking instructions, which are stored as the second child of the glacialConstGuard node. See nodes 1220-1240 of FIG. 12, and 1551 of FIG. 15, which corresponds to the snippet code to perform this evaluation. If the need to throw the exception has not changed (i.e., if it was assumed that the exception would not be thrown and the new value still does not cause the exception to be thrown, or it was assumed to throw and the new value still causes it to be thrown), as determined by the snippet code at 1552, then the same "normal" execution path (see 1530) remains appropriate for the changed value of the glacial constant. Preferably, the code at 1552 compares the newly-determined exception result to the previous result which is reflected by node 1210. If the result is not changed, then at 1553, the snippet patches the self-loop at the no-op location (1520) back to a no-op and returns control to the run-time. Otherwise, when there is a change in the exception handling, the snippet code at 1554 will execute and then return to the JIT run-time.

The snippet code at 1554 writes a jump instruction over the self-loop that has been patched into method 1500 at 1520, where this jump instruction directs control to either skip (i.e., jump around) the throw statement (if the previous execution path at 1530 comprised instructions for a throw statement) or to execute (i.e., jump to) a throw statement generated inside the snippet (if the previous execution path at 1530 was empty). For example, a jump instruction for the former case may jump from 1520 to 1540, while a jump instruction for the latter case may jump from 1520 to 1555.

For either type of glacialConstGuard node, the code snippets of preferred embodiments are generated such that the next time the method code executes following execution of a code snippet, the correct control flow path (FIG. 14) or exception path (FIG. 15) will be executed, based on the new value of the glacial constant.

The run-time support provided, in preferred embodiments, to ensure that code executes correctly when a glacial constant's value changes will now be described in more detail.

According to preferred embodiments, whenever the JIT compiler chooses to optimize a variable as a glacial constant while compiling a method, it registers the chosen variable as well as the code locations where that variable's value has been assumed to be constant. Any code snippets that must be executed if the variable's value changes are also registered. (This has been discussed earlier with reference to FIG. 2 and Block 350 of FIG. 3.)

The JIT compiler also adds, in preferred embodiments, a run-time callout or hook in any code that modifies a variable identified as a glacial constant. (This has been discussed earlier with reference to Block 340 of FIG. 3.) Continuing the example of a Java virtual machine, hooks are also added by preferred embodiments into the reflection mechanisms to invoke the run-time routine if the program indirectly changes the value of a glacial constant via reflection. (Other languages may provide other particular means or mechanisms by which a glacial constant's value may be changed. When using one of these languages, the implementation mechanisms are preferably instrumented in an analogous manner to call the run-time routine.) If the code executes and changes the value of the variable, the immediate next action, in preferred embodiments, will be to call a routine in the JIT run-time. (This has been discussed earlier with reference to Block 430 of FIG. 4.) This routine of the JIT run-time is referred to herein as "jitrtGlacialConstantChanged( )". The processing of this routine was briefly discussed above with reference to FIG. 5, and will now be described in more detail.

In preferred embodiments, the jitrtGlacialConstantChanged( ) routine is synchronized so that the updates for only one glacial constant can be performed at one time. This synchronization ensures that, if the glacial constant value changes more than once, all expressions involving the glacial constant will have used the same (most recent) value for the glacial constant.

When jitrtGlacialConstantChanged( ) is called, it is passed a parameter that identifies the particular variable whose value changed. This parameter value can be used to access the data structure (exemplified at 200 in FIG. 2) that tracks all code locations (202) that depend upon each glacial constant (201), thereby identifying the relevant code locations (i.e., locations where that variable's value has been assumed to be a particular constant value) and the associated code snippets (203) that may patch those code locations. The run-time routine then iterates over all of the identified code locations. As has been discussed above, at each location, it writes a self-loop instruction so that any active threads that are executing that code will pause while corrective actions are taken to update the assumptions that have been made. (For some processors, a self-loop cannot be atomically patched into the instruction stream. In these cases, the self-loop is preferably provided by patching in a branch to a known location in the method that contains the code for a self-loop.) Once all the self-loops have been patched into the code, the code snippets that the JIT compiler registered for the glacial constant are then called one by one.

In addition to, or instead of, using static fields as glacial constants, it may be desirable in some embodiments to treat object references as glacial constants. Assuming that objects do not typically move (or do not move often), references to locations within the objects are typically unchanged (or infrequently changed) as well. However, following a garbage collection cycle, the objects which were using heap storage may in fact have been moved. Therefore, code locations that use an object reference may need to be updated after the garbage collection cycle. In these embodiments, the JIT compiler preferably registers any object references that have been assumed as glacial constants, along with the address of the code snippet generated by the JIT compiler to update the object reference in the generated code, in an analogous manner to that which has been described herein for registering information for static variables.

When such an object is moved, the garbage collection process preferably calls a function in the JIT run-time, passing, as a parameter, the original address of the object. This run-time function is referred to herein as "jitrtGlacialAddressChanged( )". This run-time function preferably looks up the registered information for that object, patches a self-loop into generated code locations where the object's address has been assumed, and then calls the registered code snippets associated with the object reference, such that the snippets can make any necessary adjustments.

Rather than registering information with the JIT run-time, an alternative implementation choice is to allocate a bit in the object header that indicates that the object's address has been assumed to be a glacial constant. When the garbage collector moves an object that has this bit set in its header, it preferably calls the above-described JIT run-time function jitrtGlacialAddressChanged( ) in the manner which has been described.

As another example of using techniques disclosed herein with objects, the JIT compiler may make assumptions about object references that are not strictly limited to whether the address of that object may change. Suppose an object includes a static field that always points to the same object. The compiler may use the fact that the static field is a glacial constant to avoid executing checks such as determining whether the object reference is null (which it will not be, if it points to the same known object all the time, even if the object moves around). In such cases, it is not necessary to register the object reference with the JIT run-time, since no code needs to be patched: even if the object is moved.

In preferred embodiments, each snippet preferably patches over the self-loop created by jitrtGlacialConstantChanged( ). Therefore, once all the snippets have been called, all necessary corrective actions have been taken. The run-time function then returns to the code that modified the glacial constant.

In an alternative embodiment, the snippets could be executed when the value of the expression (or control flow or exception check, as appropriate) that relies on the glacial constant is needed. In this case, the role of the run-time routine jitrtGlacialConstantChanged( ) is not to patch each location with a self-loop and then invoke the snippet, but rather to patch the code location with a jump to the corresponding snippet code. Additional details of this patching will be described after the modifications to the snippet code are explained.

Because multiple threads may reach the evaluation point of a glacial constant at the same time, the snippet code is also modified. To prevent multiple threads from updating the value of an expression depending on a glacial constant, each snippet preferably includes code that first patches the jump instruction (with which the snippet is reached) with a self-loop and then uses an atomic compare-and-swap instruction to change the value of a private flag (i.e., there is one flag per snippet) from its initial value of "false" to "true". Any thread that does not see the initial "false" then branches back to the self-loop instruction just patched in, because this condition indicates that another thread has already entered the same snippet. The thread that successfully changes the flag to "true" is the one thread that should execute the code inside the snippet to compute the new value of the expression (or branch or exception check, as appropriate) involving the glacial constant. Before patching the new value back into the code stream, the private flag is set back to "false". The new instruction at the evaluation point is also stored at a predetermined location within the snippet so that the jitrtGlacialConstantChanged( ) routine can know what instruction is expected to be at the evaluation point. The requirement for storing the evaluation point instruction is explained in more detail below. Finally, the snippet branches back to the mainline code in this alternative embodiment (rather than using a return statement as described earlier).

Because a glacial constant may be modified more than once before the evaluation points for expressions involving that glacial constant are reached, the jitrtGlacialConstantChanged( ) routine is further modified to ensure that all expressions are updated with the value the glacial constant was set to most recently. When a glacial constant changes, there are three states each evaluation point can be in: 1) the evaluation point has been already updated to the previous glacial constant value and no threads are executing the snippet associated with the evaluation point; 2) the evaluation point has not yet been updated since the last change and no thread is performing the update; or 3) the evaluation point has not yet been updated but a thread is currently executing the snippet to change the value of the expression or alter the branch or exception check.

In the first case, the jump instruction is patched over the evaluation point as described earlier so that the next thread to reach the evaluation point will re-evaluate the value of the expression and patch the evaluation point. In the second case, there is nothing to do since the next thread that reaches the evaluation point will read the latest value of the glacial constant and properly update the expression. Finally, in the third case, to ensure correctness, the patching of the jump instruction over the evaluation point waits until the evaluation point has been updated by the thread currently executing the snippet, so that the new value of the expression will be updated. If there are no other evaluation points to process, then execution of the jitrtGlacialConstantChanged( ) routine waits until the evaluation point has been updated. Otherwise, the evaluation point can simply be placed on the end of the list of evaluation points to process, since it is likely that the thread currently executing the snippet will complete its update by the time the routine processes the evaluation point again.

To detect which of these situations has occurred for a particular evaluation point, the run-time routine preferably inspects the instruction it is about to patch with the jump to the snippet. If the instruction is the same as the jump instruction it is about to write to that location, then it is the second case and there is nothing further to do. If the instruction is a self-loop, then it is the third case (i.e., there is a thread executing the snippet), so the evaluation point is placed at the end of the list of evaluation points to process. Otherwise, it is the first case and the jump instruction is to be patched. To perform this evaluation, an atomic compare-and-swap is preferably performed, and the run-time needs to know the instruction that normally resides at the evaluation point. Furthermore, since that instruction will change when the glacial constant changes, the run-time routine must be able to know what the "current" value of that instruction is. Since, as described above, the snippet records the current value of this instruction, the run-time routine can load the value from a predetermined location inside the snippet and use it to perform the compare-and-swap. If, while trying to patch the jump to the snippet, the comparison fails, then the value loaded by the compare-and-swap from that location indicates what to do next. Either the loaded value is the same as the jump that was to be patched, in which case the site is already set up to be re-evaluated the next time the program executes this evaluation site, or F the loaded value is something else, in which case the evaluation point should be placed on the end of the list of evaluation sites to process. Note that loading the evaluation point instruction value from the snippet does not require synchronization: if the snippet is in the midst of updating the instruction, then it has already patched the instruction stream with the new expression value. Even if the run-time routine reads the old value of the evaluation point instruction, it will not match the current value at the evaluation point, which causes the update to be scheduled for later (at which point the correct instruction value will be loaded).

This alternative embodiment has the property that only code that the program executes will spend time to update the value of the glacial constant. A commonly-used phrase to describe this style of approach is "lazy update" because the code sites are not all updated up front; rather, they are updated "lazily" by the program, as it needs to. An advantage of this approach is that code sites that don't execute don't require the snippets to execute, which reduces the cost of changing a glacial constant's value. Techniques which may be used to coordinate updating the instruction stream when glacial constants change, in this alternative embodiment, may be adapted from the teachings of the related U.S. patent application Ser. No. 09/867,362 now U.S. Pat. No. 7,185,337), titled "Efficient Locking for Thread-Safe Self-Modifying Code".

The discussions above describe use of code-patching snippets which are generated by the JIT compiler to recover (i.e., make adjustments that may be required) when a glacial constant's value changes. Alternative embodiments will now be described that have different impacts to a program's performance. A first of these alternatives is referred to herein as "slow backup path recovery" and a second of these alternatives is referred to herein as "recompilation". (It is to be noted that neither of these two mechanisms relies on code snippets.)

Referring first to the slow backup path recovery mechanism, this mechanism preferably leverages techniques for code patching that are used when virtual invocations are devirtualized, and applies those techniques to the optimization of glacial constants, as will now be described.

When devirtualizing a virtual invocation using known techniques, a virtual guard controls whether what is executed is the devirtualized invocation or a full virtual invocation. The virtual guard is initially generated as a no-op instruction that falls through to the devirtualized invocation (and the devirtualized invocation may be in-lined directly into the method). The no-op is left alone until a class is loaded that defines a method that overrides the assumed target of the devirtualized invocation. If such a class is loaded, a jump instruction is written to the location of the no-op. The jump instruction redirects the flow of control to the backup path for the virtual guard. On this backup path, a full virtual invocation is performed, which is typically much slower than the devirtualized path. Once the virtual guard has been patched with the jump instruction, the (slower) full virtual path will always execute in subsequent executions.

The slow backup path recovery mechanism disclosed herein works in a similar manner. In this approach, a no-op is generated wherever an assumption is made on the value of the glacial constant. At the same time, a backup path is created that computes the same expression value (or control flow direction or exception check, in the other optimized situations) and then merges execution back into the method after the use of the glacial constant. The location of the no-op is registered, along with the glacial constant it depends upon, with the JIT run-time. If a glacial constant's value ever changes, then in this slow backup path recovery embodiment, the variable is no longer used as a glacial constant. Instead, all no-ops that were generated when the variable was assumed to be a glacial constant are programmatically patched to jump instructions that execute the slower backup path that directly loads the value of the variable. Note that, even if the new value would not break the assumption made in the JIT generated code, this slower backup path is preferably used. Because the backup path is used the first time the glacial constant's value is changed, this recovery mechanism is deemed to be simpler to implement than the code snippet approach described above; however, it may also provide lower performance for glacial constants whose value changes. To most effectively benefit from the use of this slow backup path recovery mechanism, therefore, care should be taken in selecting the right variables as glacial constants.

In the slow backup path recovery approach disclosed herein, the code that uses the glacial constant's value is duplicated. In one copy, the code is optimized using the constant value. The second copy is preferably left as originally specified. The code is initially laid out such that the optimized path is executed by default. If the value of the glacial constant changes, then the JIT run-time patches a jump instruction to the second copy of the code (which does not assume the variable's value is a constant). Optionally, if the value is ever changed back to the original value, the jump instruction could be patched again so that the optimized code would then execute.

An example scenario where this slow backup path recovery approach may be effective is for tracing code that might be turned on and off during program execution. By default, the r tracing code is preferably disabled, and thus the "normal" execution path is one that omits tracing-related instructions. At times, tracing might be turned on for a short while, then turned off again. This approach would provide higher performance whenever tracing is disabled, but lower performance while tracing is enabled.

Another example scenario where the slow backup path mechanism may be beneficial is with a static field whose value is only changed in the static initializer for the class. Examples of such fields were discussed earlier, and include application initialization parameters such as current time zone, locale, code page, and so forth. In another scenario, the JIT run-time may have gathered evidence (using, for example, invocation counting techniques of the type discussed earlier) that a variable's value at run-time is constant and is unlikely to change. The slow backup path mechanism may be beneficial in such scenarios.

Referring next to the recompilation mechanism, it is known that recompilation is an expensive process. Accordingly, recompilation is a heavy-handed mechanism to correct assumptions made about glacial constants when their values change. It is also a recovery mechanism that cannot always be used: if a method is currently active on any thread's execution stack when the variable changes, for example, then that method cannot always be recompiled to correct assumptions about the variable's value. (If, for example, the method does not make any invocations and performs no synchronization, then recompilation can be used to correct the method for Java Development Kit levels 1.5 and later because, even if this method is active on a thread's stack when another thread changes the variable's value, the Java Memory Model does not guarantee that the method will see the new value for the variable.)

Accordingly, the recompilation mechanism is deemed to be most beneficial for situations where assuming a variable's value to be a particular constant provides a high improvement in run-time performance, such as scenarios where assuming a variable's value is constant allows many control paths to be eliminated. (Note that, because recompilation is the recovery mechanism, all other control flow paths can be completely eliminated, which can enable significant optimization opportunities.) In such scenarios, recompilation may be advantageous for recovering from any assumption made about the variable's value in spite of the added overhead.

One example scenario where recompilation may be an advantageous recovery mechanism is where a variable is used to determine control flow, and treating the variable as a glacial constant allows eliminating many paths (and, preferably, where the method does not contain synchronization events or call other methods that might contain synchronization events, and is also known to be frequently executed, so that the benefit is fairly substantial). The recompilation approach enables optimizing the compiled code as if a glacial constant is a true constant, and completely eliminating compiled code for the control flow paths that won't execute, given the assumed constant value. This elimination of paths is possible because if the glacial constant's value does change, the method will be recompiled and therefore the code for those paths can be generated during recompilation (even though, with the initial compilation, the paths are not needed). An example of this scenario is a switch statement that controls flow based on the value of an input parameter such as locale or code page.

In the recompilation approach disclosed herein, an optimized method is preferably only recompiled by the JIT compiler when the value of a glacial constant used in that method changes and the method is actually going to be executed. This approach is therefore a lazy approach to correcting the assumptions made about the glacial constant's value: if a method that has made an assumption never executes again, no updates to the method will be made (unlike preferred embodiments of the first two approaches).

It should also be noted that even when recompilation cannot be used as the sole recovery mechanism, it may still be beneficial to use recompilation to clean up (e.g., recompile and re-optimize) methods where an assumption was made. In addition to correcting the code using one of the other mechanisms (such as use of code snippets for run-time patching), the method can be marked by the JIT run-time as a good candidate for recompilation. Upon recompilation, the method can take into account the new value of the glacial constant, which may involve making different optimization decisions.

A hybrid approach may also be provided for recovering from assumptions made about a variable, upon changes to that variable's value, whereby combinations of the above-disclosed mechanisms may be implemented.

An advantage of the code snippet approach is that it is a general approach that maintains good performance when a glacial constant's value changes. As a drawback, it must maintain all control flow paths, even if only one will execute, which reduces the optimizer's effectiveness for exploiting a glacial constant. An advantage of the slow backup path recovery mechanism is that it is relatively simple to implement. As a drawback, it is best suited only for variables whose value never changes, because the slower backup path will execute once the value changes. Recompilation has a heavy cost and is preferably only used in limited situations, but the potential performance benefits are deemed to be quite high because control flow paths that will not execute can be completely eliminated and the remaining path can be more highly optimized by the JIT compiler's optimizer.

Accordingly, when there is strong evidence that a value will never change, the slow backup path recovery may be used. In methods where recompilation can be used for recovery and there is a high degree of optimization potential if a value is treated as a constant, then recompilation may be chosen. In other cases, the code snippet approach may be preferred. And, in cases where code snippets are used but the code will be suboptimal after a change, a combination of approaches may be used whereby the method may be marked as a candidate for recompilation so that subsequent executions of the method can be made more efficient.

Note that while preferred embodiments have been described herein with reference to code from the Java programming language, and execution in a Java run-time environment, this is by way of illustration and not of limitation.

As will be appreciated by one of skill in the art, embodiments of the present invention may be provided as (for example) methods, systems, and/or computer program products. The invention can take the form of an entirely hardware embodiment, an entirely software embodiment, or an embodiment containing both hardware and software elements. In a preferred embodiment, the invention is implemented in software, which includes (but is not limited to) firmware, resident software, microcode, etc. Furthermore, the present invention may take the form of a computer program product which is embodied on one or more computer usable storage media (including, but not limited to, disk storage, CD-ROM, optical storage, and so forth) having computer-usable program code embodied therein, where this computer program product may be used by or in connection with a computer or any instruction execution system. For purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory ("RAM"), a read-only memory ("ROM"), a rigid magnetic disk, and an optical disk. Current examples of optical disks include compact disk read-only memory ("CD-ROM"), compact disk read/write ("CD-R/W"), and DVD.

Figure 16:
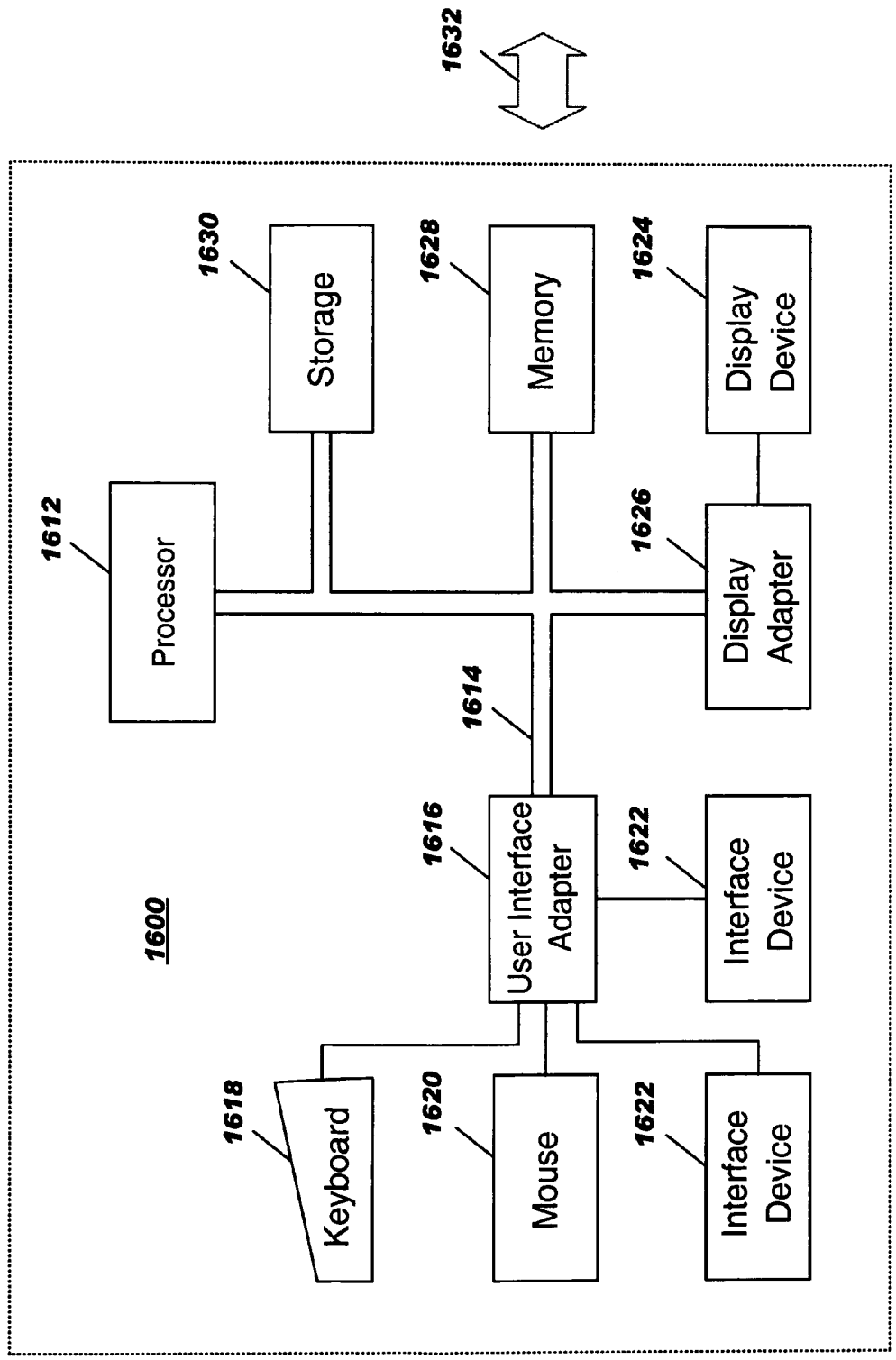
FIG. 16 depicts a data processing system suitable for storing and/or executing program code.

Referring now to FIG. 16, a data processing system 1600 suitable for storing and/or executing program code includes at least one processor 1612 coupled directly or indirectly to memory elements through a system bus 1614. The memory elements can include local memory 1628 employed during actual execution of the program code, bulk storage 1630, and cache memories (not shown) which provide temporary storage of at least some program code in order to reduce the number of times code must be retrieved from bulk storage during execution. Input/output (I/O) devices (including but not limited to keyboards 1618, displays 1624, pointing devices 1620, other interface devices 1622, etc.) can be coupled to the system either directly or through intervening I/O controllers or adapters (1616, 1626).

Network adapters may also be coupled to the system to enable the data processing system to become coupled to other data processing systems or remote printers or storage devices through intervening private or public networks (as shown generally at 1632). Modems, cable modem attachments, wireless adapters, and Ethernet cards are just a few of the currently-available types of network adapters.

The present invention has been described with reference to flow diagrams and/or block diagrams according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer_readable memory that can direct a computer or other programmable data processing apparatus to function in a particular manner, such that the instructions stored in the computer_readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

The invention claimed is:

1. A computer-implemented method of optimizing compiler-generated code, comprising:

for each of at least one selected variable for which a value thereof will be used as a glacial constant in the compiler-generated code, creating optimized compiler-generated code from source code for each of at least one method that references the selected variable, wherein the optimized compiler-generated code uses the value as the glacial constant by generating the code as if the value is a particular constant value for that selected variable; and providing a programmatic run-time adjustment capability for programmatically changing the created optimized code for a particular selected variable, at run time, to execute code that uses the value of the particular selected variable as a variable, as a replacement for the optimized compiler-generated code that uses the value as the glacial constant, upon programmatically detecting that run-time execution encounters compiler-generated code capable of causing the value of the particular selected variable to change to a different value than the particular constant value for which the optimized code was created.

2. The method according to claim 1, further comprising:

identifying, while creating the optimized code, each location in the created code where the value of each of the selected variables may be changed; and programmatically marking each of the identified locations, thereby enabling the provided programmatic run-time adjustment capability to be invoked at run-time when any of the identified locations is encountered.

3. The method according to claim 2, wherein the programmatic marking further comprises programmatically inserting a hook that will invoke the provided run-time adjustment capability.

4. The method according to claim 3, wherein the programmatically inserted hook is inserted into each of the identified code locations.

5. The method according to claim 3, wherein the programmatically inserted hook is inserted into a class loader that loads code to be executed at the identified code locations.

6. The method according to claim 3, wherein the programmatically inserted hook is inserted into code capable of causing the value of one of the selected variables to be indirectly changed.

7. The method according to claim 2, further comprising:

registering, for each of the identified locations, information for use in invoking the provided programmatic run-time adjustment capability.

8. The method according to claim 7, further comprising:

detecting, at run-time, that one of the identified locations is encountered; and responsive to the detection, using the registered information to dynamically invoke the provided programmatic run-time adjustment capability.

9. The method according to claim 7, wherein the registered information further comprises an identifier of the selected variable and, for each of the identified locations where the value of that variable may change, a location where run-time adjustments may be needed and an entry point of a code snippet capable of evaluating and performing the run-time adjustments.

10. The method according to claim 7, further comprising:

detecting, at run-time, that one of the identified locations is encountered;

determining each code location that may be affected if the value of the selected variable is changed at the encountered location;

patching a self-loop into each of the determined code locations;

determining, for each of the determined code locations, a code snippet that is associated therewith and that specifies code capable of performing run-time adjustments for the determined code locations; and dynamically invoking each of the determined code snippets, wherein each invoked code snippet executes its specified code for performing the run-time adjustments and then programmatically removes the patched self-loop.

11. The method according to claim 10, wherein:

at least one of the code snippets further specifies code capable of evaluating and performing the run-time adjustments for the determined code locations; and the dynamic invocation of each of the at least one code snippets further comprises first executing the code snippet's specified code for evaluating whether the created optimized code should behave differently for the different value of the variable and only if so, then executes the code snippet's specified code to perform the run-time adjustments before programmatically removing the patched self-loop.

12. The method according to claim 7, further comprising:

detecting, at run-time, that one of the identified locations is encountered;

determining each code location that may be affected if the value of the selected variable is changed at the encountered location;

cooperatively suspending execution of all threads that may execute the created optimized code;

determining, for each of the determined code locations, a code snippet that is associated therewith and that specifies code capable of performing run-time adjustments for the determined code locations;

dynamically invoking each of the determined code snippets, wherein each invoked code snippet executes its specified code for performing the run-time adjustments; and after all such code snippets have completed executing, restarting the execution of all of the suspended threads.

13. The method according to claim 7, further comprising:

detecting, at run-time, that one of the identified locations is encountered;

determining each code location that may be affected if the value of the selected variable is changed at the encountered location; and patching a branch instruction at each determined code location that directs execution to a code snippet associated therewith.

14. The method according to claim 13, wherein:

at least one of the code snippets further specifies code capable of evaluating and performing the run-time adjustments for the determined code locations;

each of the at least one snippets further specifies code for patching a self-loop instruction at the associated code location that directed execution to the snippet;

patching the self-loop instruction will be performed by a single thread while all other threads that reach the snippet are redirected back to execute the self-loop instruction;

the single thread entering the snippet performs the run-time adjustment, which includes patching the self-loop instruction with a result of the adjustment; and the single thread branches back to the associated code location.

15. The method according to claim 1, wherein, for at least one of the selected variables, at least one of the at least one method uses the variable in an expression, and wherein the created optimized code simplifies the expression by using the referenced variable as having the particular constant value.

16. The method according to claim 1, wherein, for at least one of the selected variables, at least one of the at least one method uses the variable in determining a control flow, and wherein the created optimized code simplifies the control flow by assuming the run-time control flow follows a selected one of a plurality of execution paths, wherein the selected one is the execution path to be followed when the referenced variable has the particular constant value.

17. The method according to claim 1, wherein, for at least one of the selected variables, at least one of the at least one method uses the variable in exception checking, and wherein the created optimized code simplifies the exception checking by assuming an execution path corresponding to a particular run-time result of the exception checking and omitting, from the assumed execution path, compiler-generated code for performing the exception checking and for carrying out execution of different compiler-generated code corresponding to an alternative run-time result of the exception checking, wherein the particular run-time result occurs when the referenced variable has the particular constant value.

18. The method according to claim 15, wherein the provided programmatic run-time adjustment capability further comprises an executable code snippet that computes a new value for the expression, using the different value of the referenced variable, and patches the computed new value into the optimized compiler-generated code.

19. The method according to claim 16, wherein the provided programmatic run-time adjustment capability further comprises an executable code snippet that computes a new value for an expression that determines the control flow, using the different value of the referenced variable, and if a different one of the plurality of executions path should be followed when the expression has the new value, patches in a jump to the different one of the execution paths.

20. The method according to claim 17, wherein the provided programmatic run-time adjustment capability further comprises an executable code snippet that computes a new result for the exception checking, using the different value of the referenced variable, and if the new result is different from the particular run-time result, patches in a jump to skip over exception-throwing code, if present in the assumed execution path, or to jump to exception-throwing code in the code snippet, otherwise.

21. The method according to claim 1, wherein at least one of the selected variables is defined as a static variable.

22. The method according to claim 1, wherein at least one of the selected variables is defined as an instance variable.

23. The method according to claim 1, wherein at least one of the selected variables is defined as field of a class for which a singleton design pattern is applicable.

24. The method according to claim 1, wherein the selected variables are selected by counting a number of locations in the created code where the value thereof may be changed and comparing the counted number to a threshold.

25. The method according to claim 24, wherein the counted locations further comprise locations inlined into other methods where the location updates the selected variables.

26. The method according to claim 1, wherein at least one of the selected variables comprises a reference to a location of an object.

27. The method according to claim 1, wherein the provided programmatic run-time adjustment capability further comprises:
generating, for each of at least one of the selected variables in addition to the optimized compiler-generated code, a backup path for the selected variable, wherein the backup path comprises compiler-generated code that uses the selected variable as a variable; and
executing the generated backup path, rather than the optimized compiler-generated code, if the value of the at least one selected variable changes from the particular constant value.

28. The method according to claim 1, wherein the provided programmatic run-time adjustment capability further comprises:
marking, for at least one of the selected variables, each method that references the variable, such that code for the marked method will automatically be recompiled if the value of the selected variable changes from the particular constant value;
automatically recompiling code for each marked method, upon a run-time detection that the value of the selected variable changes from the particular constant value; and
executing the recompiled code rather than the previously-generated optimized compiler-generated code.

29. A system for optimizing compiler-generated code, comprising:
a computer comprising a processor; and
instructions which are executable, using the processor, to implement functions comprising:
programmatically identifying at least one variable for which a value thereof will be used as a glacial constant in the compiler-generated code;
creating, for each programmatically-identified variable, optimized compiler-generated code from source code for each of at least one method that references the selected variable, wherein the optimized compiler-generated code trcats uses the value as the glacial constant by generating the code as if the value is a particular constant value for that selected variable; and
providing a programmatic run-time adjustment capability for programmatically changing the created optimized code for a particular selected variable, at run time, to execute code that uses the value of the particular selected variable as a variable, as a replacement for the optimized compiler-generated code that uses the value as the glacial constant, upon programmatically detecting that run-time execution encounters compiler-generated code capable of causing the value of the particular selected variable to change to a different value than the particular constant value for which the optimized code was created.

30. The system according to claim 29, wherein the functions further comprise:
identifying, while creating the optimized code, each location in the created code where the value of each of the selected variables may be changed;
programmatically marking each of the identified locations, thereby enabling the provided programmatic run-time adjustment capability to be invoked at run-time when any of the identified locations is encountered;
registering, for each of the identified locations, information for use in invoking the provided programmatic run-time adjustment capability;
detecting, at run-time, that one of the identified locations is encountered; and
responsive to the detection, using the registered information to dynamically invoke the provided programmatic run-time adjustment capability.

31. The system according to claim 30, wherein the functions further comprise:

detecting, at run-time, that one of the identified locations is encountered;

determining each code location that may be affected if the value of the selected variable is changed at the encountered location;

patching a self-loop into each of the determined code locations;

determining, for each of the determined code locations, a code snippet that is associated therewith and that specifies code capable of performing run-time adjustments for the determined code locations; and dynamically invoking each of the determined code snippets, wherein each invoked code snippet executes its specified code for performing the run-time adjustments and then programmatically removes the patched self-loop.

32. A computer program product for generating code using glacial constants, the computer program product embodied on one or more computer-usable storage media and comprising computer-readable program code that, when executed on a computer, causes the computer to:

programmatically identify at least one variable for which a value thereof will be used as a glacial constant in the compiler-generated code;

create, for each programmatically-identified variable, optimized compiler-generated code from source code for each of at least one method that references the selected variable, wherein the optimized compiler-generated code uses the value as the glacial constant by generating the code as if the value is a particular constant value for that selected variable; and provide a programmatic run-time adjustment capability for programmatically changing the created optimized code for a particular selected variable, at run time, to execute code that uses the value of the particular selected variable as a variable, as a replacement for the optimized compiler-generated code that uses the value as the glacial constant, upon programmatically detecting that run-time execution encounters compiler-generated code capable of causing the value of the particular selected variable to change to a different value than the particular constant value for which the optimized code was created.

33. The computer program product according to claim 32, wherein the computer-readable program code, when executed on the computer, further causes the computer to:

identify, while creating the optimized code, each location in the created code where the value of each of the selected variables may be changed;

programmatically mark each of the identified locations, thereby enabling the provided programmatic run-time adjustment capability to be invoked at run-time when any of the identified locations is encountered;

register, for each of the identified locations, information for use in invoking the provided programmatic run-time adjustment capability;

detect, at run-time, that one of the identified locations is encountered; and responsive to the detection, use the registered information to dynamically invoke the provided programmatic run-time adjustment capability.

34. The computer program product according to claim 33, wherein the computer-readable program code, when executed on the computer, further causes the computer to:

detect, at run-time, that one of the identified locations is encountered;

determine each code location that may be affected if the value of the selected variable is changed at the encountered location;

patch a self-loop into each of the determined code locations;

determine, for each of the determined code locations, a code snippet that is associated therewith and that specifies code capable of performing run-time adjustments for the determined code locations; and dynamically invoke each of the determined code snippets, wherein each invoked code snippet executes its specified code for performing the run-time adjustments and then programmatically removes the patched self-loop.

* * * * *